US010707611B2

(12) United States Patent
Harmelink et al.

(10) Patent No.: US 10,707,611 B2
(45) Date of Patent: Jul. 7, 2020

(54) ELECTRICAL CONNECTOR WITH AUTOMATIC LATCHING

(71) Applicant: Deere & Company, Moline, IL (US)

(72) Inventors: Gregory K. Harmelink, Moorhead, MN (US); Jon T. Jacobson, Fargo, ND (US); Michael A. Hajicek, West Fargo, ND (US)

(73) Assignee: DEERE & COMPANY, Moline, IL (US)

(*) Notice: Subject to any disclaimer, the term of this patent is extended or adjusted under 35 U.S.C. 154(b) by 0 days.

(21) Appl. No.: 16/278,448

(22) Filed: Feb. 18, 2019

(65) Prior Publication Data
US 2019/0260161 A1 Aug. 22, 2019

Related U.S. Application Data

(63) Continuation of application No. 15/900,435, filed on Feb. 20, 2018, now Pat. No. 10,326,236.

(51) Int. Cl.
H01R 13/62 (2006.01)
H01R 13/627 (2006.01)
(Continued)

(52) U.S. Cl.
CPC .......... *H01R 13/6273* (2013.01); *B60D 1/64* (2013.01); *H01R 12/716* (2013.01); *H01R 13/447* (2013.01); *H01R 13/506* (2013.01); *H01R 13/5219* (2013.01); *H01R 13/633* (2013.01); *H01R 13/6395* (2013.01); *H01R 2201/26* (2013.01)

(58) Field of Classification Search
CPC . H01R 13/6273; H01R 12/716; H01R 13/447

USPC .......................................................... 439/78
See application file for complete search history.

(56) References Cited

U.S. PATENT DOCUMENTS 2,496,208 A * 1/1950 Hasselbaum ...... H01R 13/5219
                                                    439/144
4,312,553 A * 1/1982 Lyckesjo .................. B60D 1/64
                                                    439/281
(Continued)

FOREIGN PATENT DOCUMENTS

DE    202009002880 U1    7/2010
EP       0568030 A1     11/1993
(Continued)

OTHER PUBLICATIONS

European Search Report issued in counterpart application No. 19158406.9 dated Jul. 1, 2019. (10 pages).

*Primary Examiner* — Alexander Gilman

(57) ABSTRACT

An electrical connector comprises a first housing member that engages a second housing member engages to form an enclosure. In the enclosure, a substrate supports a central set of conductive members in a second tubular portion. A first arm is pivotably attached to the second housing member. The first arm is resiliently biased inwardly toward the second base portion. A second arm is pivotably attached to the second housing member and spaced apart from the first arm. The second arm is resiliently biased inwardly toward the second base portion. In accordance with one aspect, the arms support automatic latching of the connector portion to a mating connector.

16 Claims, 7 Drawing Sheets

(51) Int. Cl.
*H01R 13/447* (2006.01)
*H01R 13/633* (2006.01)
*H01R 12/71* (2011.01)
*H01R 13/52* (2006.01)
*H01R 13/506* (2006.01)
*B60D 1/64* (2006.01)
*H01R 13/639* (2006.01)

(56) References Cited

U.S. PATENT DOCUMENTS

| | | | | |
|---|---|---|---|---|
| 5,302,141 | A * | 4/1994 | O'Reilly | B60D 1/64 |
| | | | | 439/144 |
| 5,595,492 | A * | 1/1997 | Taguchi | H01R 13/6295 |
| | | | | 439/157 |
| 5,709,561 | A * | 1/1998 | Cadoret | H01R 13/6293 |
| | | | | 439/144 |
| 5,785,532 | A * | 7/1998 | Maue | B60R 16/0238 |
| | | | | 439/34 |
| 5,873,744 | A * | 2/1999 | Ramos, Jr. | H01R 13/6275 |
| | | | | 439/144 |
| 5,951,309 | A * | 9/1999 | Hopper | H01R 13/447 |
| | | | | 439/136 |
| 6,054,779 | A * | 4/2000 | Zubko | B60Q 1/305 |
| | | | | 307/10.8 |
| 6,450,833 | B1 * | 9/2002 | Brown, Jr. | B60D 1/64 |
| | | | | 439/518 |
| 6,554,626 | B2 * | 4/2003 | Ramos, Jr. | H01R 13/405 |
| | | | | 439/144 |
| 6,827,594 | B1 * | 12/2004 | Davis | H01R 13/6293 |
| | | | | 439/157 |
| 6,840,782 | B1 * | 1/2005 | Borden | H01R 4/643 |
| | | | | 439/92 |
| 7,491,065 | B2 * | 2/2009 | Wagner | H01R 13/5213 |
| | | | | 439/35 |
| 7,967,617 | B2 * | 6/2011 | Vonnegut | H01R 13/6658 |
| | | | | 439/142 |
| 8,167,639 | B2 * | 5/2012 | Weidner | H01R 13/62 |
| | | | | 439/352 |
| 8,192,216 | B1 * | 6/2012 | Puluc | H01R 13/64 |
| | | | | 439/271 |
| 8,251,732 | B2 * | 8/2012 | Armacost | H01R 13/745 |
| | | | | 439/347 |
| 8,376,758 | B2 * | 2/2013 | Sell | B60D 1/64 |
| | | | | 439/34 |
| 8,535,071 | B1 * | 9/2013 | Mueller | B60D 1/64 |
| | | | | 439/144 |
| 8,939,785 | B2 * | 1/2015 | Chiu | H01R 13/621 |
| | | | | 439/333 |
| 9,415,730 | B2 * | 8/2016 | Scheele | B60R 16/0239 |
| 9,496,639 | B2 * | 11/2016 | Harmon | H01R 13/5202 |
| 9,543,719 | B2 * | 1/2017 | Bartholomew | H01R 13/6395 |
| 9,806,478 | B2 | 10/2017 | Bartholomew et al. | |
| 9,825,404 | B2 * | 11/2017 | Yoshigi | H01R 12/58 |
| 10,326,236 | B1 * | 6/2019 | Harmelink | H01R 13/5219 |
| 2003/0054688 | A1 * | 3/2003 | Howard | H01R 13/447 |
| | | | | 439/559 |
| 2007/0072461 | A1 * | 3/2007 | Williams | H01R 13/5219 |
| | | | | 439/144 |
| 2009/0195971 | A1 * | 8/2009 | Phillips | H02G 3/16 |
| | | | | 361/643 |
| 2011/0056723 | A1 * | 3/2011 | Slippy | H01R 13/5808 |
| | | | | 174/73.1 |
| 2012/0202377 | A1 * | 8/2012 | Puluc | H01R 13/5219 |
| | | | | 439/559 |
| 2013/0130525 | A1 * | 5/2013 | Hachadorian | H01R 13/5213 |
| | | | | 439/142 |
| 2014/0377970 | A1 * | 12/2014 | Crovetti | H01R 13/5213 |
| | | | | 439/131 |

FOREIGN PATENT DOCUMENTS

| | | |
|---|---|---|
| EP | 1492203 A2 | 12/2004 |
| EP | 1686658 A2 | 8/2006 |
| WO | 2013119276 A1 | 8/2013 |

* cited by examiner

US 10,707,611 B2

ELECTRICAL CONNECTOR WITH AUTOMATIC LATCHING

RELATED APPLICATION

This is a continuation of U.S. patent application Ser. No. 15/900,435, filed on Feb. 20, 2018, and claims the benefit (under 35 U.S.C. § 120) of the above previously filed application, which is hereby incorporated by reference into this disclosure.

FIELD

This disclosure relates to an electrical connector, for a vehicle, with automatic latching.

BACKGROUND

In the prior art, an implement bus breakaway connector (IBBC) is used for off-road equipment. For example, the IBBC can support electrical connections for between a tractor and an implement via an implement cable that terminates in a mating member (e.g., socket). The electrical connector is typically mounted on the tractor or other propulsion unit via a standard mounting configuration, such as the ISO 11783-2 (ISOBUS standard). If the operator forgets to unplug the mating member from the electrical connector while separating the tractor and the implement, the break-away feature allows the controlled disconnection between the mating member and the electrical connector without damaging the cable. The conventional IBBC supports a controller area network (CAN) data bus with several conductors. However, the conventional IBBC may not support automatic latching or locking of the mating member to the connector.

SUMMARY

In accordance with one embodiment, an electrical connector comprises a first housing member that has a first base portion, and a first tubular portion extending outward from the first base portion. A second housing member has a second base portion, a second tubular portion extending outward from the second base portion. The second housing member engages the first housing member (e.g., via snap-fit connectors) to form an enclosure. In the enclosure a substrate supports a central set of conductive members within the second tubular portion. A first arm is pivotably attached to the enclosure or an outer enclosure. The first arm is resiliently biased inwardly toward the second base portion. A second arm is pivotably attached to the enclosure and spaced apart from the first arm. The second arm is resiliently biased inwardly toward the second base portion. In accordance with one aspect, the arms support automatic latching of the connector portion to a mating connector portion.

DETAILED DESCRIPTION

Figure 1:
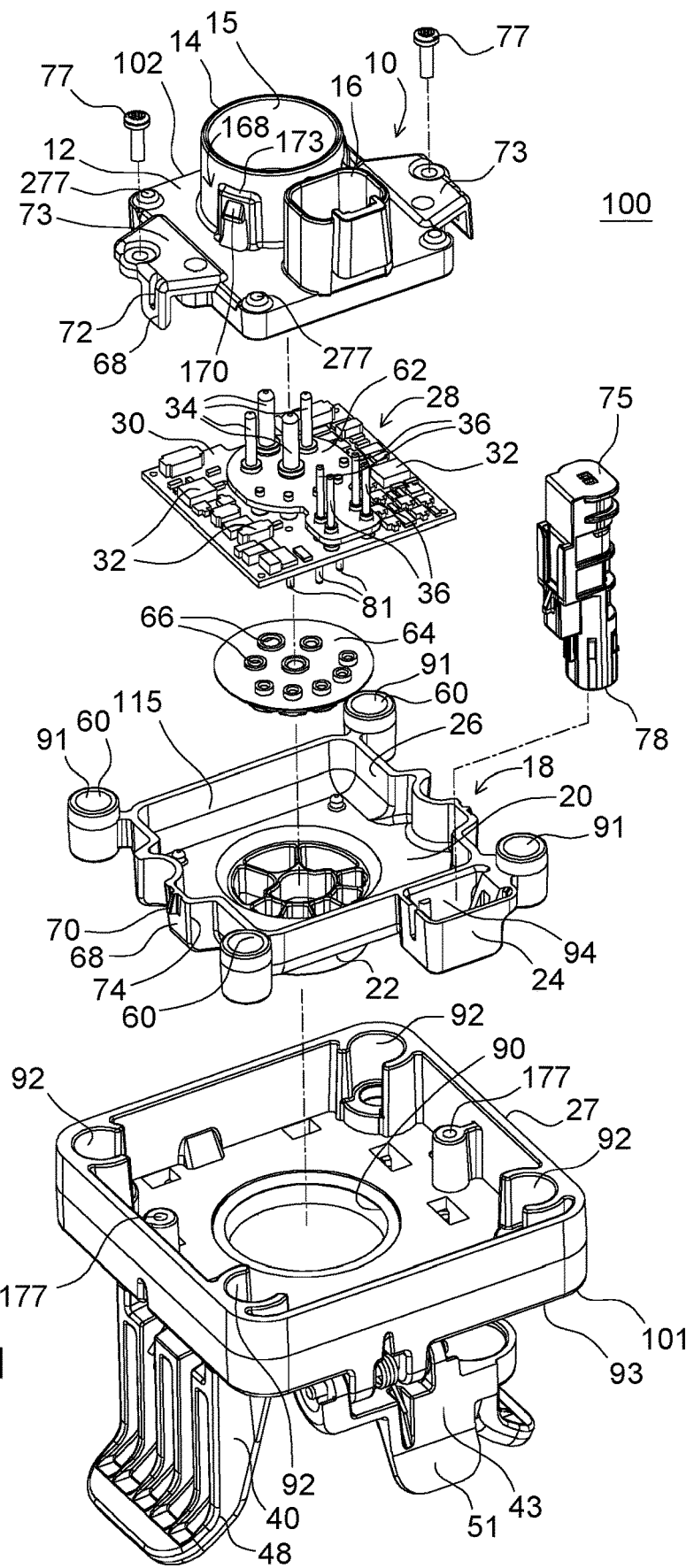
FIG. 1 is an exploded perspective view of the electrical connector.

In accordance with one embodiment, in FIG. 1 an electrical connector 100 comprises a first housing member 10 that has a first base portion 12, a first tubular portion 14 (e.g., first tubular support) extending outward from the first base portion 12 and a first hollow support 16 extending outward from the first base portion 12. A second housing member 18 has a second base portion 20, a second tubular portion 22 (e.g., second tubular support) extending outward from the second base portion 20 and a second hollow support 24 (with recess 94, possibly with mating features on interior walls to retain a first data port and second data port) extending outward from the second base portion 20. The second housing member 18 engages the first housing member 10 (e.g., via snap-fit connectors 68) to form an enclosure 26. A substrate 28 is disposed within the enclosure 26, where the substrate 28 supports a central set of conductive members (34, 36) within the first tubular portion 14 and the second tubular portion 22. An interior 15 of the first tubular portion 14 contains a central set of conductive members 34, or metallic pins. The substrate 28 supports a peripheral set of conductive members (34, 36) within the first hollow support 16.

In one embodiment, an outer enclosure 27 is connected to the enclosure 26. For example, the enclosure 26 or the second housing member 18 may comprise a set of sleeves 91 located about a periphery of the enclosure 27 or the second housing member 18. The sleeves 90 can be inserted into corresponding pockets 92 in the outer enclosure 27 to connect the outer enclosure 27 to the enclosure 26.

In one embodiment, a first arm 40 is pivotably attached to the outer enclosure 27 via a protruding hinge portion 83, which extends outward from the outer enclosure 27. In an alternate embodiment, the first arm 40 is pivotably attached to the enclosure 26 or the second housing member 18. The first arm 40 is resiliently biased inwardly toward the exterior 93 of the outer enclosure 27, or toward second base portion 20, via one or more springs 55 or other resilient members associated with a protruding hinge portion 83.

In one embodiment, a second arm 42 is pivotably attached to the outer enclosure 27 via a protruding hinge portion 83, which extends outward from the outer enclosure 27. In an alternate embodiment, the second arm 42 is pivotably attached to the enclosure 26 or the second housing member 18. The second arm 42 is spaced apart from the first arm 40. The second arm 42 is resiliently biased inwardly toward the exterior 93 of the outer enclosure 27, or toward the second base portion 20, via one or more springs 55 or other resilient members associated with the protruding hinge portion 83.

Figure 2:
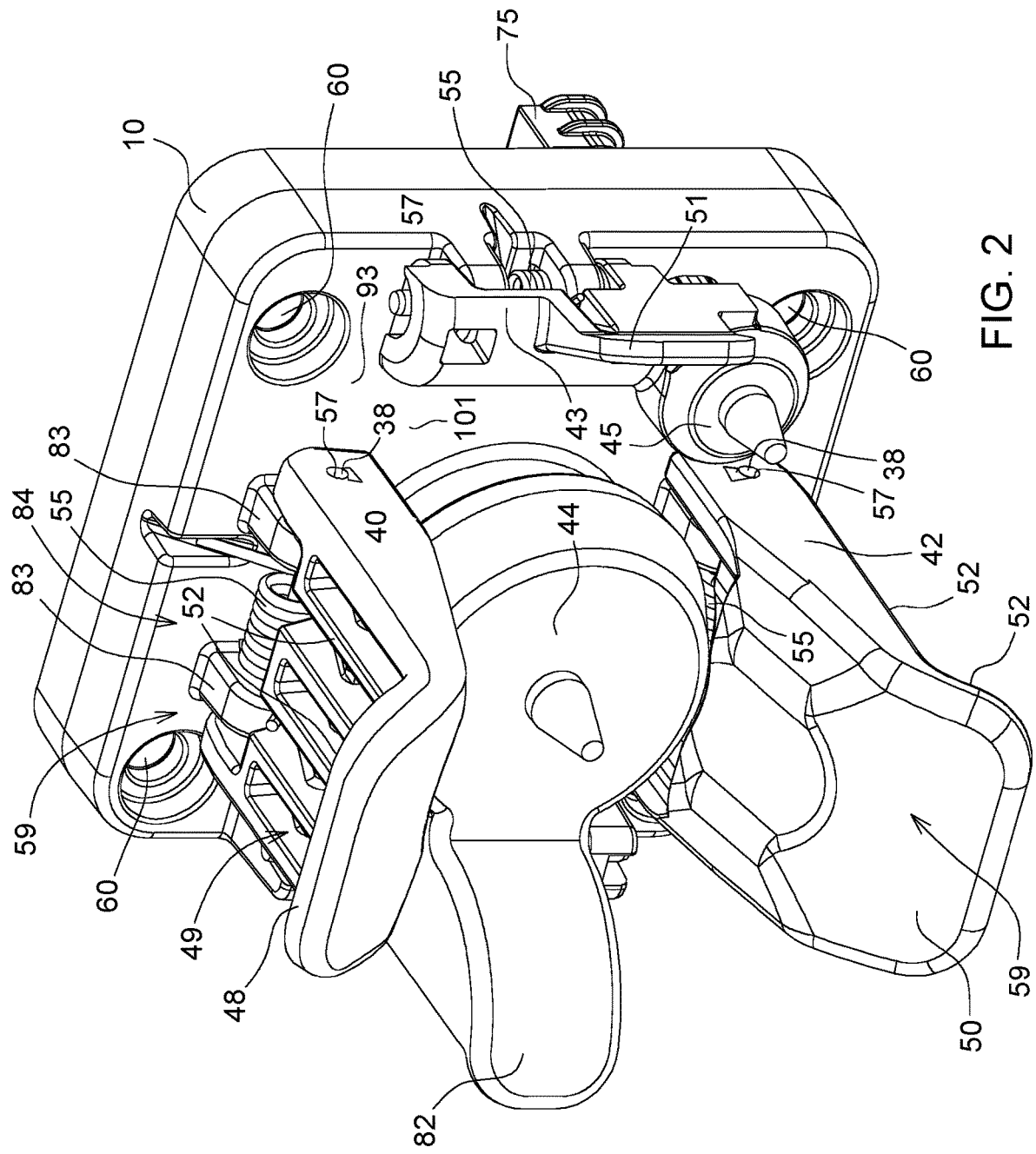
FIG. 2 shows a perspective view of an outer side or implement side of the assembled electrical connector of FIG. 1 with a first lid covering the socket or connector portion.
Figure 3:
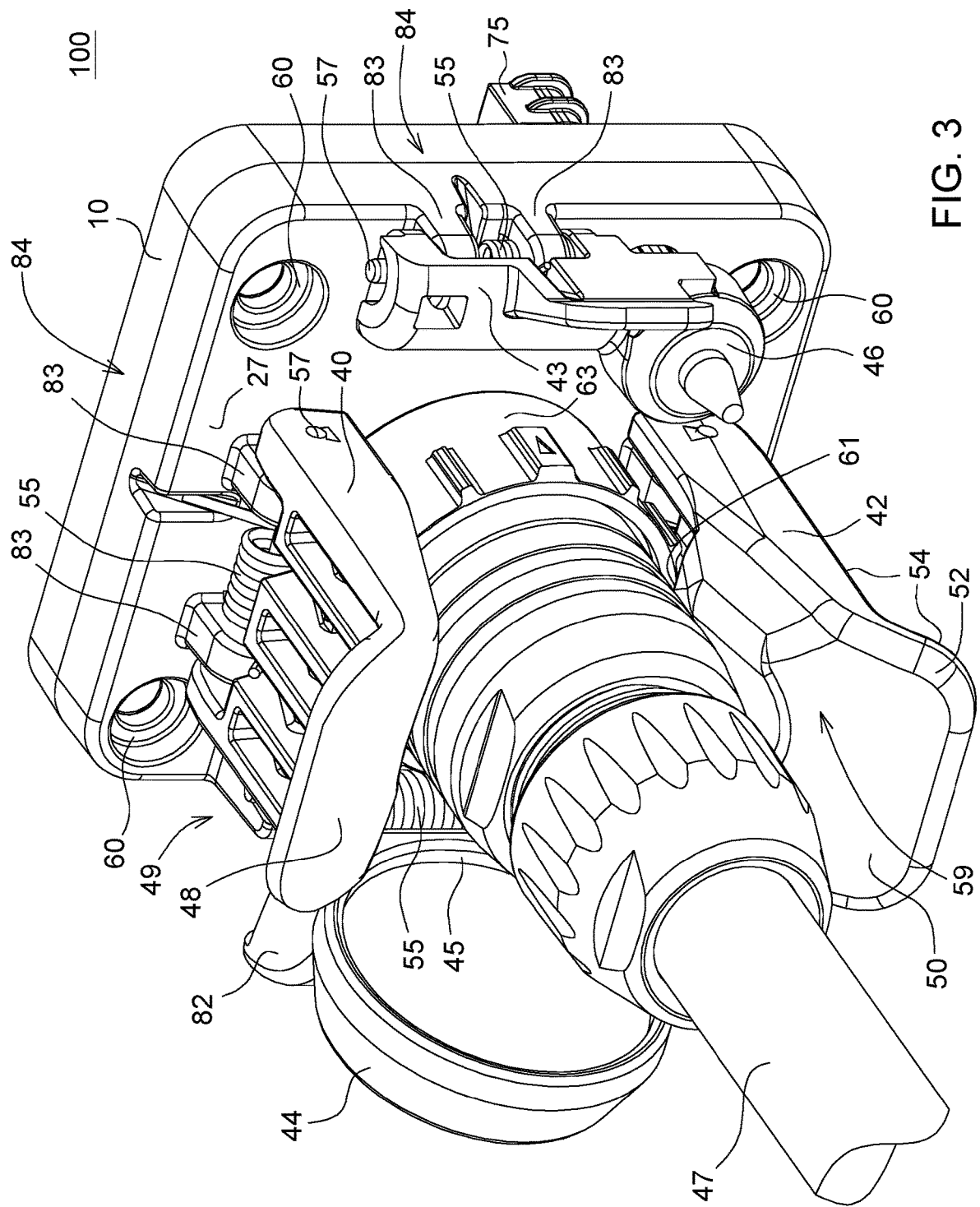
FIG. 3 shows a perspective view of an outer side of the assembled electrical connector of FIG. 1 with a mating connector engaged with the socket or connector portion.

In accordance with one aspect, the arms (40, 42) support automatic latching of the connector portion 79 (in FIG. 7) to a mating connector portion 63, where the latched state is illustrated in FIG. 3. In one embodiment as illustrated in FIG. 2, the first arm 40 terminates in a first tab 48; the second arm 42 terminates in a second tab 50; and a third arm 43 terminates a third tab 51. The first arm 40 and first tab 48 are collectively referred to as the first pawl 49; the second arm 42 and the second tab 50 are collectively referred to as the second pawl 59; the third arm 43 the third tab are collectively referred to as the third pawl 58.

In one configuration, the first housing member 10, the second housing member 18 and the outer enclosure 27 can be made or formed by injection molding of plastic, a polymer, fiber-filled plastic, a fiber-filled polymer, a plastic matrix that binds of filler, or a polymer matrix that binds a filler. The filler or fiber may comprise glass fiber, carbon fiber, ceramic fiber, glass filler, or other filler.

Figure 6:
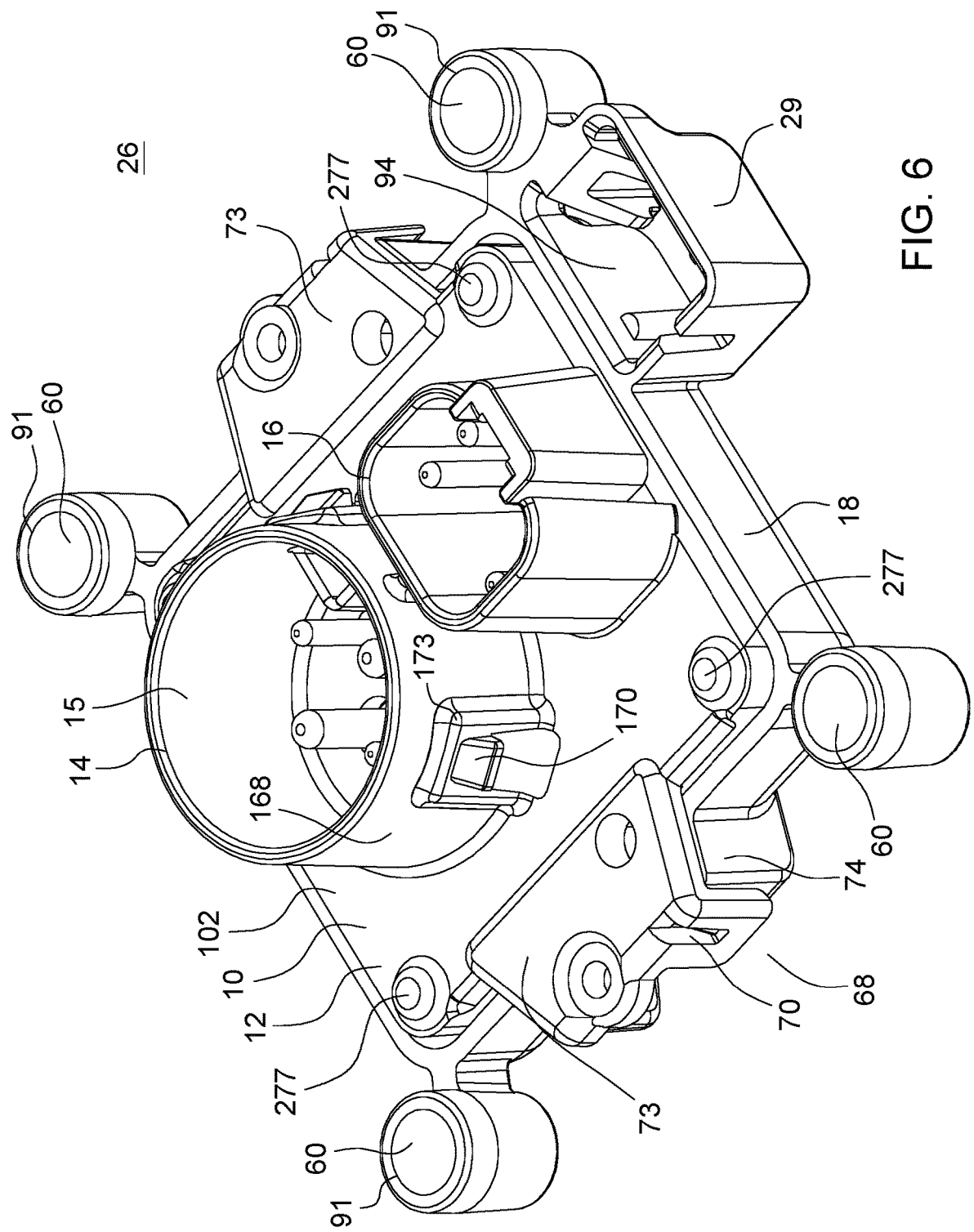
FIG. 6 shows a perspective view of an inner side of the electrical connector of FIG. 1, which shows the first housing member connected to the second housing member without the outer enclosure.
Figure 7:
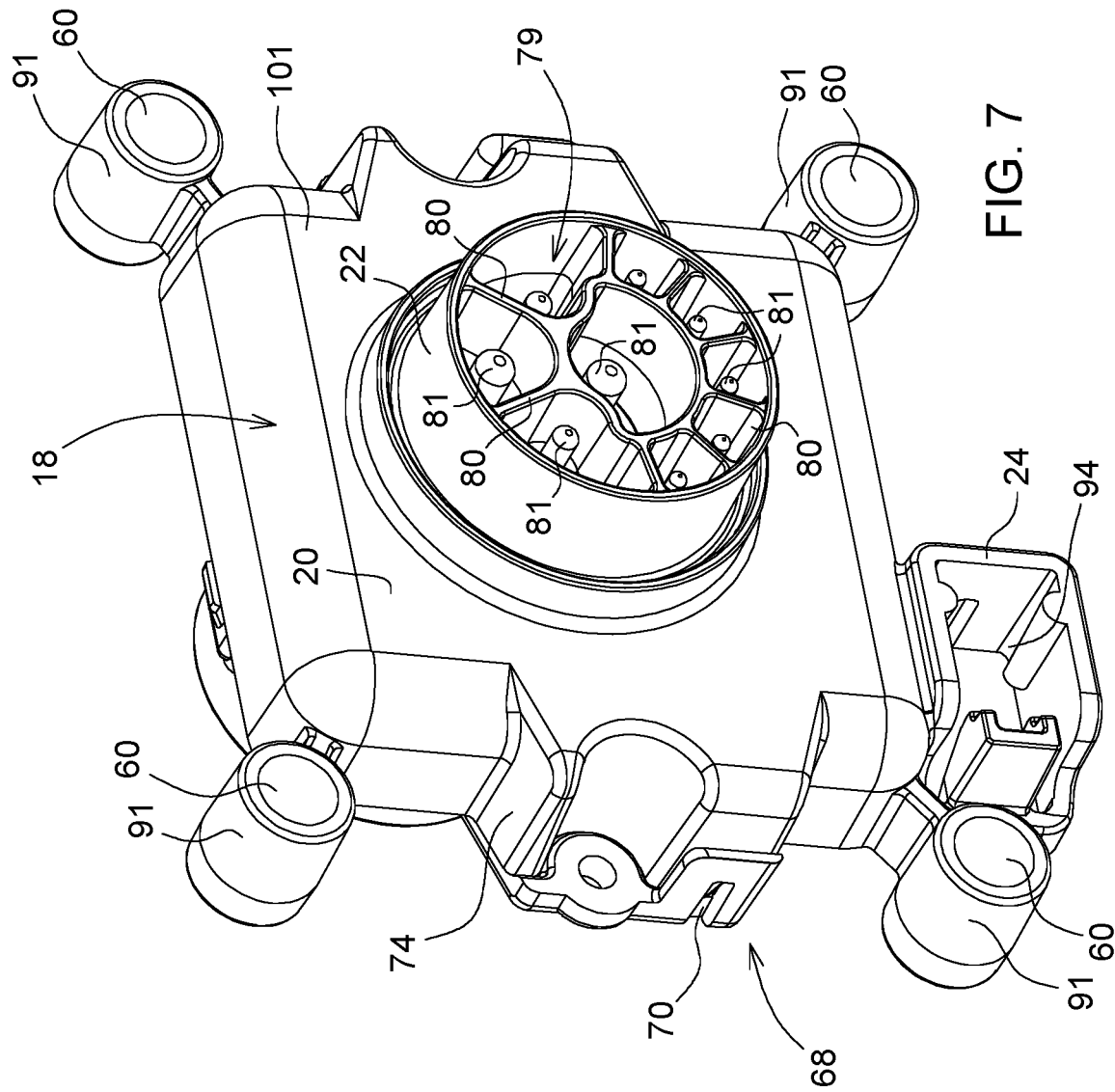
FIG. 7 shows a perspective view of an outer side of the electrical connector similar to FIG. 6.

As illustrated in FIG. 1, FIG. 6 and FIG. 7, collectively, the second housing member 18 engages with and connects to the first housing member 10 via one or more snap-fit connectors 68. For example, the first housing member 10 has a plurality of first snap-fit connector portions (70 or 72) and wherein the second housing member 18 has a plurality of second snap-fit connector portions (70 or 72) to interlock with corresponding ones of each other to join and secure the first housing member 10 and the second housing member 18. As illustrated, each snap-fit connector 68 comprises a connector protrusion 70 that interlocks or engages with connector slot 72 to form a snap-fit connection between the first housing member 10 and the second housing member 18 (e.g., near wings 73 and respective mating wall portion 74).

In an alternate embodiment, the snap-fit connectors 68 may be replaced or supplemented by fasteners 277 that engage corresponding bores or anchors in the second housing member 18.

In one embodiment, the central conductive members 34 are sealed with respect to the second housing member 18 or the second base portion 20 via an elastomeric seal 64 with openings 66 to receive the central conductive members 34. The elastomeric seal 64 can be compressed between the substrate 28 and an annular portion or step in an interior 115 of the second housing member 18. The elastomeric seal 64 may be composed of silicone rubber, synthetic rubber or natural rubber, for example. The elastomeric seal 64 may be used alone or with additional sealant, plastic resin, polymer resin, filler, or potting compound to provide a hermetic, weather-resistant seal that is resistant to salt and fog, for instance.

After the first housing member 10 and the second housing member 18 are connected to form an enclosure 26, an optional outer enclosure 27 may be mounted on the outer surface of the enclosure 26 via interlocking of the sleeves and respective sockets 92. However, in an alternate embodiment the outer enclosure 27 may be mounted on the outer surface of the enclosure 26 via one or more fasteners 77 (e.g., that engage corresponding receptacles 177 associated with the enclosure 26). The outer enclosure 27 is associated with protruding supports or protruding hinges 83 that extend outward from the outer enclosure 27. If the outer enclosure 27 is not used, then the protruding supports or protruding hinges 83 may extend from the second housing member 18. The integral protruding hinge 83 or protruding supports along with corresponding shafts 57 form pivot points 84 upon which the first arm 40, the second arm 42, and third arm 43 can rotate. The integral protruding hinge 83 or protruding supports have openings for receiving corresponding shafts 57. One or more coil springs 55 are coaxially mounted about or on respective shafts 57 to bias the first lid 44 and the second lid 46 toward or in respective closed position. In one embodiment, one or more coil springs 55 or other resilient members bias the first arm 40, the second arm 42, and the third arm 43 toward an exterior 93 of the outer enclosure 27 or second housing member 18. In other words, one or more coil springs 55 are coaxially mounted about or on respective shafts 57 to bias the first pawl 49, the second pawl 59, and third pawl 58 toward an exterior 93 of the outer enclosure 27. In one configuration, one end of the spring 55 is retained by a retention slot 53 in an exterior of the outer enclosure 27, whereas an opposite end of the spring is retained by a corresponding retention slot in the first pawl 49 or second pawl 59.

In one embodiment, the first lid 44 is associated with an arm portion 41 that terminates in a tab portion 82. The arm portion 41 of the first lid 44 has an opening for receiving a respective shaft 57 associated with one or more springs 55 coaxially mounted about the shaft 57. The second lid 46 is associated with a third arm 43 that has an opening for receiving a respective shaft 57 associated with one or more springs 55 mounted about the shaft 57.

The first arm 40 has an opening or bore 38 for receiving a respective shaft 57 associated with one or more springs 55 coaxially mounted about the shaft 57. The second arm 42 has an opening or bore 38 for receiving a respective shaft 57 associated with one or more springs 55 coaxially mounted about the shaft 57.

In one embodiment, the first lid 44 has an arm portion 41 with an opening or bore 38 for receiving a shaft 57 or hinge pin. Opposite the arm portion 41, the first lid 44 terminates in a tab portion 82 that serves as a handle that can be manipulated by a user's hand or one or more fingers. The first lid 44 comprises a cap or cover that is mounted to the second housing member 18, outer enclosure 27 or base using a shaft 57 or hinge pin (e.g., composed of metal or an alloy). In one embodiment, the ends of the shaft 57 are retained by push nuts or retention rings that mate with a respective groove in the shaft 57. In one embodiment, a spring 55 or double torsion coil spring is used to bias the first lid 44 in a closed position over the end of the second tubular portion 22 (e.g., as shown in FIG. 5). The first lid 44 holds a seal 45 (e.g., in FIG. 4 an elastomeric substantially annular face seal 45) in a compressed state to keep dirt, debris and moisture out of the unmated connector. The first lid 44 can swing open or handle by a tab 82 or handle portion. The arm portion 41 of the first lid 44 at an end opposite of the hinged end supported by a protruding hinge 83. The opened first lid 44 exposes the connector portion 79 for use or connection with a mating connector portion 63. Here, the connector portion 79 is illustrated as a socket that contains conductive pins 81 or substantially circular vehicle connector. The connector portion 79 may include optional dielectric compartments 80 or walls to separate respective conductive pins 18 from each other.

In one embodiment as illustrated in FIG. 5 during a closed state of a first lid 44, the first arm 40 has a first notch 61 or first seating portion that presses against an annular end of the first lid 44. Similarly, during a closed state of the first lid 44, the second arm 42 has a seating portion or second notch 61 that presses against an annular end of the first lid 44.

Figure 4:
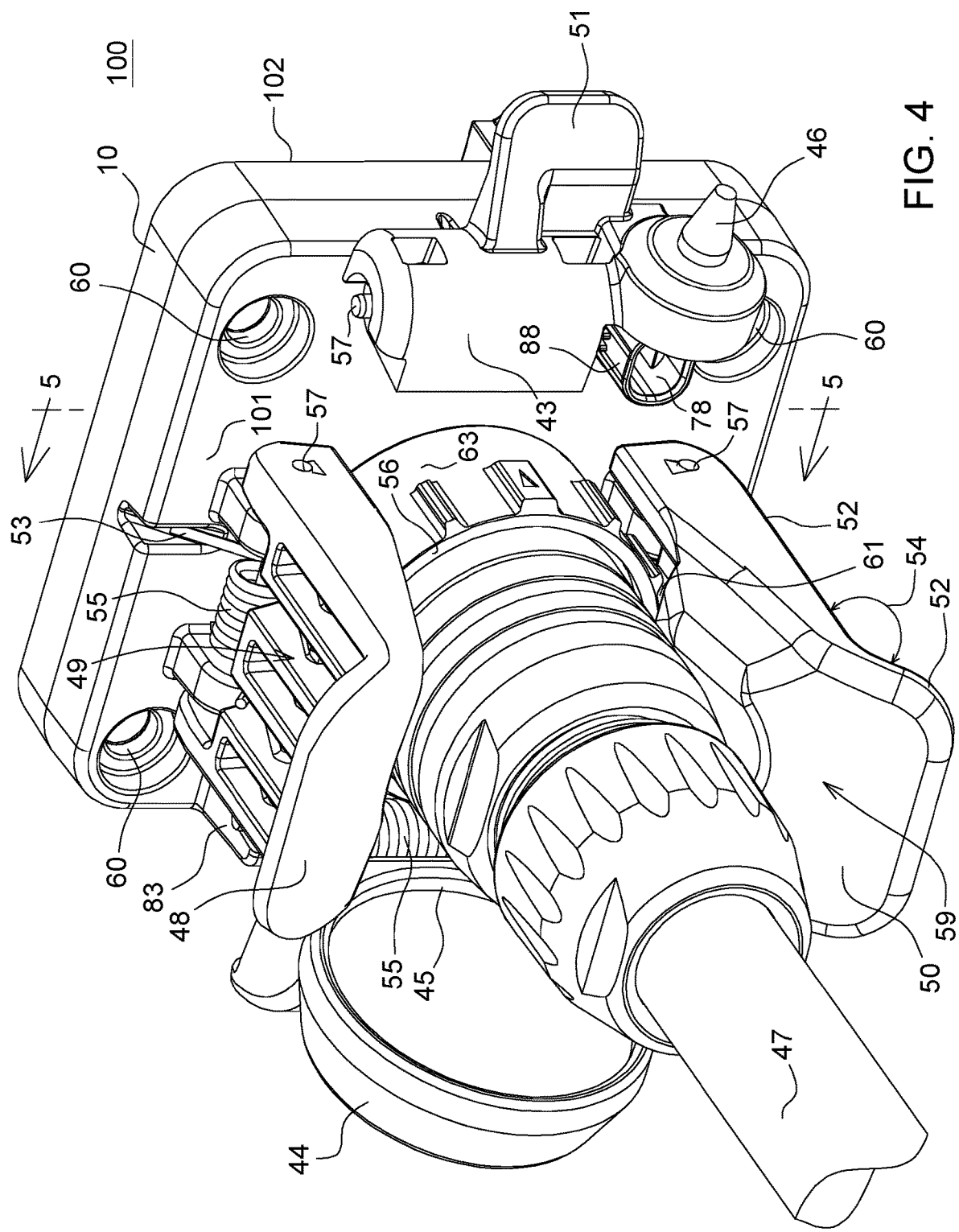
FIG. 4 shows a perspective view of an outer side of the assembled electrical connector of FIG. 1 with the second lid open to expose a data port.
Figure 5:
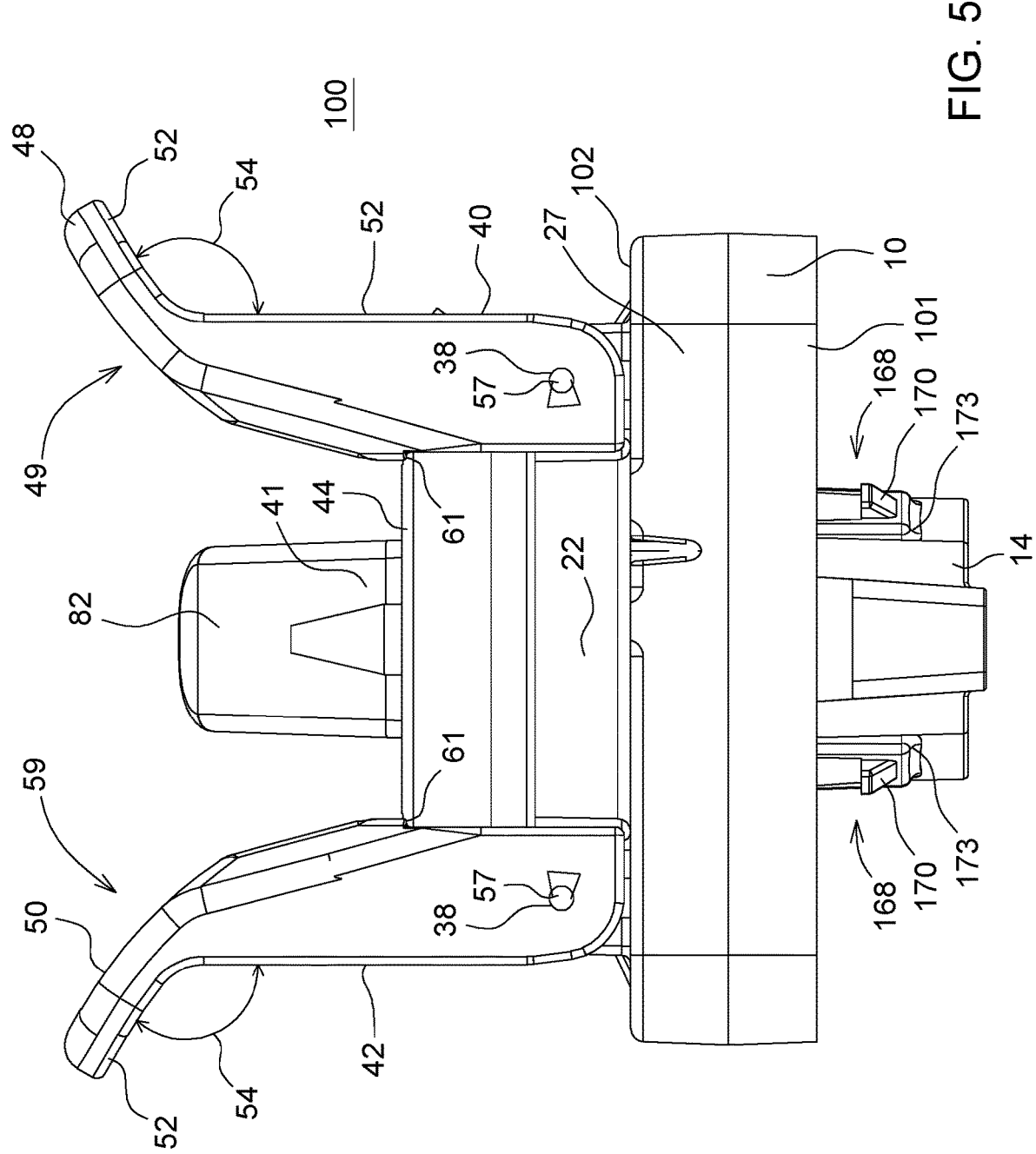
FIG. 5 is a cross section shown along reference line 5-5 of FIG. 4.

The connected data refers to a state when the mating connector portion 63 is plugged in or connected to the connector portion 79 as illustrated in FIG. 3 and FIG. 4. For example, in the connected state the mating connector portion 63 is engaged with a socket, port or connector portion 79 in the end of the second tubular portion 22. During the connected state, the first arm 40 or first pawl 49 has a first notch 61 (or first seating surface) that engages or presses against an annular step 56 or shelf of the mating connector portion 63 to latch or lock removably the connection in place between the mating connector portion 63 and the connector portion 79. Meanwhile, during the connected state, the second arm 42 or second pawl 59 has a second notch 61 (or second seating surface) that presses against the annular step 56 or shelf of the mating connector portion 63 to latch or lock removably the connection in place between the mating connector portion 63 and the connector portion 79. For example, the notches 61 (e.g., first seating portion and the second seating portion) are positioned on oppositely (e.g., 180 degrees apart) with respect to a substantially annular end of the second tubular portion 22.

In one configuration, the first arm 40 and the second arm 42 have notches 61 for automatically latching to (and pressing against) a first lid 44 that is hinged to the connector in a closed state and for automatically latching to (and pressing against a step in) a mating connector portion 63 in a releasable connected state. For example, the notches 61 comprise seating surfaces and the notches 61 press against the first lid 44 in the closed state to form a hermetic seal 45 via an annular ring in an interior 115 of the first lid 44 that presses against an end of the second tubular portion 22. In one embodiment, the notches 61 press against an end (e.g., annular end) or a step (e.g., annular step or rectangular step) in the mating connector portion 63 in a connected state to secure removably the mating connector portion 63 to the connector portion 79, where the mating connector portion 63 will automatically release from the connector portion 79 if an outward pulling force on the mating connector portion 63 exceeds a threshold level.

A first lid 44 covers an end of the second tubular portion 22. The first lid 44 is hinged to the second housing member 18 and biased toward the end of second tubular portion 22. A second lid 46 covers a corresponding container 88 that is associated with a data port 76, where the data port 76 may comprise a first port 75, a second port 78, or both. The second lid 46 is hinged to the outer enclosure 27, or second housing member 18, and biased toward the container 88. The second lid 46 is attached to a third arm 43 that terminates in a third tab 51. The third arm 43 has a notch 61 for retaining a mating data port connector portion in a removably connected state when the mating connector data port connector portion is connected to the corresponding data port 76.

In one embodiment, as shown in FIG. 4, the second lid 46 is opened to expose conductors of a data port, such as an Ethernet port, a Universal Serial Bus (USB) port, an ADSL (Asymmetric Digital Subscriber Line) port, or Very High Bitrate Digital Subscriber Line (VDSL) within the container 88. Under a first example, the conductors of the data port 76 comprise two pins associated with two-wire Ethernet, two-wire ADSL or two-wire VDSL. Under a second example, the conductors of the data port 76 comprise four pins associated with four wire Ethernet or four-wire shielded USB port.

In one embodiment, the substrate 28 comprises a circuit board 30 with electrical and electronic components 32 to support communications of Controller Area Network (CAN) data messages over particular conductive members 34 of the central set and the particular conductive members 36 of the peripheral set.

In one embodiment, as illustrated in FIG. 5, the first arm 40 terminates in a first tab 48 and the second arm 42 terminates a second tab 50, wherein the first tab 48 and the second tab 50 comprise handles to support release, by a human hand, of a mating connector portion 63 from engagement with the connector 79, or the second tubular support 22. In one example, the outer surfaces 52 of the first arm 40 and the first tab 48 form an angle 54 that is greater than a substantially orthogonal angle 54 to form a handle that can be pressed against readily to open a closed state or connected state of the electrical connector 100. Similarly, the outer surfaces 52 of the second arm 42 and the second tab 50 form an angle 54 that is greater than a substantially orthogonal angle 54 to form a handle that can be pressed against readily to open a closed state or connected state of the electrical connector 100.

In one embodiment, the outer side 101 or implement side of the electrical connector 100, opposite the inner side 102 or tractor side, provides connector portion 79 (e.g., an integrated circular connector feature or port) with conductive members 81 for mating with mating connector portion 63 or socket with conductors that makes electrical and mechanical contact with the conductive members 81. The outer side 101 or implement side of the electrical connector 100 provides a plurality of integral hinges 83 that project outward from the outer side 101 to provide pivot points 84 for a first lid 44, first arm 40, a second arm 42, and a second lid 46 (or third arm 43 associated with the second lid 46). The first arm 40, the second arm 42 and the third arm 43 may terminate in respective tabs (48, 50, 82) that can provide handles for a user to operate to connect and disconnect a mating connector portion 63 (e.g., mating plug or socket) to the connector portion 79 of the electrical connector 100. Collectively, an arm (40, 42, 43) and corresponding tab (48, 50) are referred to as pawl (49, 59). The arms or pawls (49, 59) are supported by a shaft 57 or hinge pin that is mounted between protruding hinges 83 that extend outward from the surface of the second housing member 18 or outer enclosure 27, where the torsion spring 55 biases the arms or pawls (49, 59) toward the second housing member 18 or outer enclosure 27. In one illustrative configuration, the electrical connector may have standard footprint to match the ISO 11783-2 (ISOBUS) four bolt mounting footprint of openings 60 on a vehicle.

In one embodiment, the pawls (49, 59) are arranged with the hook portions, seating portions, or notches 61 facing inward towards the second tubular portion 22 or connector portion 79 (e.g., substantially circular vehicle connector). The pawls (49, 59) are spring-loaded (e.g., by springs 55) or resiliently biased to latch or close towards the end of the second tubular portion 22 or connector portion 79 (e.g., implement connector portion). Both pawls (49, 59) can rotate or swing respective handle portions in a pawl arc in a pawl plane that is generally perpendicular to a lid arc or lid plane of the first lid 44. The travel of each pawl (49, 59) in the inward pawl arc is limited by a stop or limit of the pawl (49, 59) or its arm at or near the respective hinge 83, such as a bottom edge of the pawl (49, 59) or its respective arm (40, 42) that rests against an exterior 93 of the outer enclosure 27. Accordingly, both pawls (49, 59) are always separated by at least a minimum distance (e.g., minimum lateral distance proportional to the dimensions or width of the mating connector portion 63) between hook portions, seating portions or notches 61, such that the mating connector portion 63 can be readily, removably connected or disconnected.

Normally Closed and Sealed State

In one embodiment, the electrical connector 100 has several states, such as a normally closed and sealed state for the first lid 44, the second lid 46, or both. The normally closed and sealed state refers to a state in which the mating connector portion 63 is disconnected from the connector portion 79 (e.g., substantially circular vehicle connector). If the mating connector portion 63 is disconnected or if the connector portion 79 is not in use, then the first lid 44 will be closed covering and sealing hermetically the connector opening of the connector portion 79. Similarly, if the mating connector is disconnected from the data port 76, such as an Ethernet port or USB port, then the second lid 46 will be closed covering and sealing hermetically the connector opening or container 88 to prevent the ingress of moisture, dirt, debris and contaminants.

The first lid 44 is a cap or cover for protecting the connector 79 from the ingress of dirt, debris, contaminants, salt, corrosive chemicals, or moisture that might otherwise damage (e.g., corrode) the conductor members 81 or interfere with a reliable electrical connection associated with the electrical connector 100 and a corresponding mating connector portion 63. If the first lid 44 is closed, then the first pawl 49 or first arm 40 and the second pawl 59 or second arm 42 latch or resiliently bias the first lid 44 in the closed position, against an annular step 56 (in FIG. 4), by the notches 61, seating portions or hook features. If the second lid 46 is closed, then the third arm 43 or third pawl latch or resiliently bias the second lid 46 in the closed position, against the container 88, by a notch 61, seating portion or hook feature.

Manual Release and Opening of First Lid

If the user presses (e.g., strikes) the tabs (48, 50) or handles of the arms (40, 42) with the palm of his or her hand and if the user simultaneously grasps the handle, then the arms (40, 42) will move outward and unlatch allowing the first lid 44 to be opened. If the first lid 44 is opened sufficiently, then the user can manually insert of the mating connector portion 63 portion of the electrical connector 100 into the connector portion 79 to form a reliable electrical and mechanical connection between the vehicle and an external cable 47 and connector portion 79 (e.g., associated with an implement, such as a towed implement). In one illustrative example, the mating connector portion 63 comprises an implement harness connector.

Manual Insertion of the Mating Implement Harness Connector

If the user holds the first lid 44 or cover open with one hand and grasps the mating connector portion 63 (e.g., implement harness connector) with the other hand while pushing the mating connector portion 63 end through the opening formed by the pawls (49, 59), then the pawls (49, 59) will open to receive the mating connector portion 63. If the mating connector portion 63 (e.g., implement harness connector) pushes past the pawls (49, 59) to a fully seated condition, then both pawls (49, 59) will return to a rest position which that positively retains or latches the mating connector portion 63 to the electrical connector 100 in the mated and sealed position, which can also be referred to as a connected state.

Manual Release of Implement Harness Connector

If the user grasps or pulls on the mating connector portion 63 (e.g., mated implement harness connector) and if the user presses (e.g., bumps) simultaneously into the pawls (49, 59) with the hand (e.g., knuckles of his or her hand) in a connected state or latched state, then the pawls (49, 59) will move outward and unlatch allowing or handle portion the mating connector portion 63 to disconnect from the electrical connector 100 or second tubular portion 22. If or once the mating connector portion 63 (e.g., implement harness connecter) is manually released and removed, then the electrical connector 100 will automatically latch onto the cover 44 in a closed state.

Automatic Positive Latching

If the mating connector portion 63 (e.g., implement harness connector) is unmated and removed from the vehicle electrical connector, then the first lid 44 or cover will automatically push past the pawls (49, 59) to close over top of the end of the second tubular portion 22 or the vehicle connector opening of connector portion 79. If the first lid 44 is closed completely, then both pawls (49, 59) will return to a rest position which positively retains or latches the first lid 44 in the closed and sealed position.

Break Away Release of Implement Harness Connector

If the mating connector portion 63 portion (e.g., the mated implement harness) is pulled away from the vehicle electrical connector 100 with sufficient force, then the pawls (49, 59) will open releasing the mating connector portion 63 (e.g., implement harness connector) without damage to the electrical connector or the mating connector portion 63, or the mated implement cable 47 or wire harness.

Whenever the Break Away Release Occurs, then Automatic Latching Will Occur.

The electrical connector 100 of the disclosure features a robust spring-loaded hinge pin design (e.g., shaft 57 and torsion springs 55) for connector's moving parts to foster reliability and longevity. The electrical connector 100 is well suited for providing automatic latching of one or more lids and automatic latching between the electrical connector and mating connector portion (e.g., 63), such as an implement harness connector or data port connector. Accordingly, the automatic latching of lids protects the conductive members from damage, corrosion and the ingress of dirt and debris that might otherwise interfere with a reliable electrical connection between the electrical connector and mating connector portion. The electrical connector provides additional space that supports a high-speed data connection, such as Ethernet, two-wire Ethernet, four-wire Ethernet or USB.

Having described the preferred embodiment, it will become apparent that various modifications can be made without departing from the scope of the invention as defined in the accompanying claims.

The following is claimed:

1. An electrical connector comprising:
    a first housing member having a first base portion, a first tubular portion extending outward from the first base portion;
    a second housing member having a second base portion, a second tubular portion extending outward from the second base portion; the second housing member engaging the first housing member to form an enclosure;
    in the enclosure, a substrate supporting a central set of conductive members within the second tubular portion to form a connector portion;
    a plurality of protruding hinges projecting from an exterior of the electrical connector;
    a first arm pivotably attached to an exterior of the electrical connector at one of the protruding hinges, the first arm resiliently biased inwardly toward the exterior; and
    a second arm pivotably attached to the exterior at another one of the protruding hinges and spaced apart from the first arm, the second arm being on an opposite side of the connector portion from the first arm, the second arm resiliently biased inwardly toward the exterior.

2. The electrical connector according to claim 1 wherein the first arm and the second arm have respective notches for automatically latching to a first lid that is hinged to the connector in a closed state and for automatically latching to a mating connector portion in a releasable connected state.

3. The electrical connector according to claim 2 wherein the notches press against the first lid in the closed state to form a hermetic seal via an annular ring in an interior of the first lid that presses against an end of the second tubular portion.

4. The electrical connector according to claim 2 wherein the notches press against a step in the mating connector in a connected state to secure removably the mating connector portion to the connector, where the mating connector portion will automatically release from the connector if an outward pulling force on the mating connector portion exceeds a threshold level.

5. The electrical connector according to claim 1 wherein the second housing member engages with and connects to the first housing member via a snap-fit connector.

6. The electrical connector according to claim 1 wherein the first housing member has a plurality of first snap-fit connector portions and wherein the second housing member has a plurality of second snap-fit connector portions to interlock with corresponding ones of each other to join and secure the first housing member and the second housing member.

7. The electrical connector according to claim 1 wherein the central conductive members are sealed with respect to the second housing member via an elastomeric seal with openings to receive the central conductive members.

8. The electrical connector according to claim 7 wherein the elastomeric seal is compressed between the substrate and an annular portion in an interior of the second housing member.

9. The electrical connector according to claim 1 further comprising:
a first lid for covering an end of the second tubular portion, the first lid hinged to the second housing member and biased toward the end of second tubular portion.

10. The electrical connector according to claim 1 wherein the substrate comprises a circuit board with electrical and electronic components to support communications of Controller Area Network (CAN) data messages over particular conductive members of the central set and the particular conductive members of the peripheral set.

11. The electrical connector according to claim 1 wherein the first arm terminates in a first tab and the second arm terminates a second tab, wherein the first tab and the second tab support release, by a human hand, of a mating connector portion from engagement with the first tubular portion or a connector portion.

12. The electrical connector according to claim 11 wherein outer surfaces of the first arm and the first tab form an angle that is greater than a substantially orthogonal angle and wherein outer surfaces of the second arm and the second tab form an angle that is greater than a substantially orthogonal angle.

13. The electrical connector according to claim 1 wherein the first arm has a first seating portion that presses against an annular end of the second tubular portion when a mating connector portion is engaged with a connector portion in the end of the second tubular portion and wherein the second arm has a second seating portion that presses against the annular end of the second tubular portion when the connector mating portion is engaged a connector portion in an end of the second tubular portion.

14. The electrical connector according to claim 13 wherein the first seating portion and the second seating portion are positioned on oppositely on the annular end of the second tubular portion.

15. An electrical connector comprising:
a first housing member having a first base portion, a first tubular portion extending outward from the first base portion;
a second housing member having a second base portion, a second tubular portion extending outward from the second base portion; the second housing member engaging the first housing member to form an enclosure with a set of pockets;
in the enclosure, a substrate comprising a circuit board and supporting a central set of conductive members within the second tubular portion to form a connector portion on an outer side of the electrical connector;
a plurality of integral hinges projecting from the outer side;
a first arm pivotably attached to the outer side at one of the integral hinges, the first arm resiliently biased inwardly toward the outer side; and
a second arm pivotably attached to the outer side at another one of the integral hinges and spaced apart from the first arm, the second arm being on an opposite side of the connector portion from the first arm, the second arm resiliently biased inwardly toward the outer side.

16. The electrical connector according to claim 15 wherein the enclosure comprises a set of pockets around its periphery, and wherein the outer enclosure has sleeves that interlock with the corresponding pockets.

* * * * *